United States Patent [19]

MacDonald et al.

[11] Patent Number: 4,695,103

[45] Date of Patent: Sep. 22, 1987

[54] DISKETTE HOLDER

[75] Inventors: John B. MacDonald, Dedham, Mass.; David E. McLinn, Merrimack, N.H.

[73] Assignee: Continental Molding Corporation, Auburn, Me.

[21] Appl. No.: 856,285

[22] Filed: Apr. 28, 1986

[51] Int. Cl.$^4$ .............................................. A47B 81/06
[52] U.S. Cl. .................................... 312/18; 206/425; 312/15; 312/193; 312/312
[58] Field of Search ........................ 312/15, 16, 17, 18, 312/19, 193, 330 R, 312; 206/425, 804

[56]  References Cited

U.S. PATENT DOCUMENTS

| 1,349,272 | 8/1920 | Foss et al. | 312/15 |
| 1,405,993 | 2/1922 | Fargo | 206/425 |
| 1,574,319 | 2/1926 | Vincent | 312/19 X |
| 1,606,857 | 11/1926 | Whitmore | 312/19 X |
| 1,840,728 | 1/1932 | Longford | 312/19 |
| 1,845,470 | 2/1932 | Wood | 312/330 R |
| 2,539,647 | 1/1951 | Williams | 312/19 |
| 3,463,305 | 8/1969 | Cline | 206/804 X |
| 3,606,034 | 9/1971 | Lewis | 206/425 X |
| 4,202,585 | 5/1980 | Lawler | 312/18 X |
| 4,516,812 | 5/1985 | Gander et al. | 312/18 X |

FOREIGN PATENT DOCUMENTS

| 1175964 | 4/1959 | France | 312/193 |
| 174827 | 2/1922 | United Kingdom | 206/804 |

Primary Examiner—Kenneth J. Dorner
Assistant Examiner—Thomas A. Rendos
Attorney, Agent, or Firm—Finnegan, Henderson, Farabow, Garrett & Dunner

[57]  ABSTRACT

A container particularly adapted for storing diskettes having an interior portion with a plurality of slots each adapted to receive a diskette to be stored. Indexing means in the form of a cam follower is adapted to move along a worm gear perpendicular to the diskettes within the holder. The cam follower sequentially engages during movement the stored diskettes and each engaged diskette is slidably moved out of alignment with the remainder of the diskettes to expose an edge portion thereof. The edge portion exposed has an indicia of identification, such as a tag or label, which is in this manner exposed for identification.

12 Claims, 7 Drawing Figures

DISKETTE HOLDER

BACKGROUND OF THE INVENTION

Articles in the form of substantially flat rectangular or square diskettes, such as used in word processing or the microfilm industry, are stored in generally rectangular, elongated holders, with the holders having slots into which each individual diskette is inserted for storage. The holders may be in the form of a case or a drawer within a cabinet. Since these diskettes are generally of relatively thin cross section and are aligned in side-by-side relation during storage in conventional slotted holders, it is difficult for a person seeking a particular diskette to view the indicia of identification on the diskette. Typically, the indicia of indentification are provided on an upper edge portion of each diskette in the form of a tag or label. Conventionally, it is necessary to manually slide each diskette within the slot a distance from the remainder of the diskettes to permit the indicia of indentification to be viewed so that the desired diskette may be identified and selected.

OBJECT OF THE INVENTION

It is accordingly a primary object of the present invention to provide a diskette holder that permits sequential viewing of each indicia of identification for each diskette stored without requiring manual removal of each diskette for this purpose.

SUMMARY OF THE INVENTION

The present invention overcomes the problems and disadvantages of the prior art by providing a container for storing a plurality of susbstantially flat articles, such as word-processing diskettes and the like, having an article holder with an elongated generally rectanagular interior having a plurality of slots. Each slot is adapted to receive an article to be stored with the articles being aligned in side-by-side relation and being slidable in opposite directions within these slots. Indexing means is adapted for movement along the elongated interior of the holder to sequentially engage preferably a bottom edge portion of each article. As each article is so engaged it slides within the slot to a position out of alignment with and above that of the remainder of the stored articles. Each article may have an indicia of identification on an edge portion opposite the edge engaged by the indexing means. Consequently, when the indexing means engages an article edge portion and slides the engaged article the indicia of identification will be above and out of alignment with the indicia of identification of the remaining articles. This permits ready viewing of the indicia of identification by one seeking a particular article from storage. The indexing means may include a cam that sequentially engages the edge portion and preferably the bottom of each article. The articles may be stored typically with the edge of each article resting on the base of the holder and the indexing means may be in the form of a cam that is adapted for reciprocal movement along this base. Cam moving means may be provided for imparting reciprocal movement to the cam. The cam moving means may be a worm gear and a worm drive gear drivingly connected to the worm gear for imparting rotational movement to the worm gear. The cam may be a follower connected to the worm gear to move along the worm gear upon rotation thereof. The cam moving means may further include means for manually operating the worm drive gear, such as a manually operated wheel. Preferably, the cam follower of the indexing means engages the bottom edges of the articles at substantially the midpoint thereof. The worm gear preferably extends along the base of the holder below and substantially perpendicular to the article edges resting on the base. The manually-operated wheel for moving said worm drive gear is preferably journaled on the holder for driving engagement with the worm drive gear.

Figure 1:
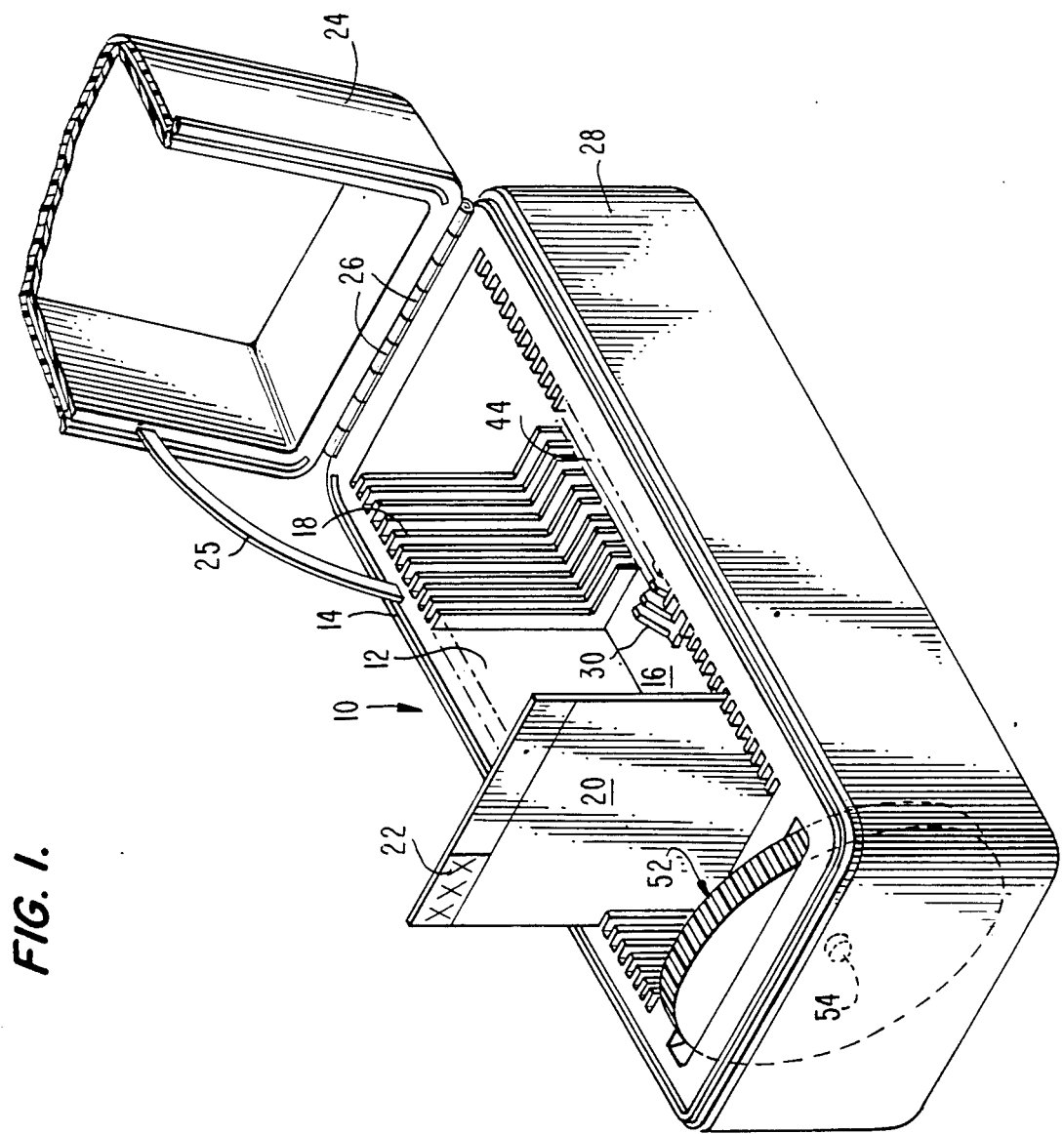
FIG. 1 is a perspective view of one embodiment of a diskette holder of the invention.

These drawings, which are incorporataed in and constitute a part of this specification, illustrate an embodiment of the invention and, together with the description, serve to explain the principles of the invention.

DESCRIPTION OF THE PRREFERRED EMBODIMENT

The container for storing a plurality of substantially flat articles, such as word-processing diskettes and the like in accordance with the invention comprises an article holder, with the preferred embodiment being shown in FIGS. 1, 2, 3 and 4 of the drawings, designated generally as 10. Further in accordance with the preferred embodiment, the holder 10 has an elongated generally rectangular interior portion 12 including elongated side walls 14 and base 16. The side walls 14 and base 16 have a plurality of slots 18 each of which is adapted to store a diskette 20. The diskette 20 in accordance with the invention has indicia of identification, which in accordance with the preferredd embodiment may be a label 22. Further as shown in the preferred embodiment, a lid 24 is connected by hinges 26 to holder 10. The lid is restrained from opening beyond a desired arc by a sliding control arm 25. Arm 25 extends through an opening 27 in interior portion 12 of the holder. It is connected to lid 24 at one end by rivet 29, and the opposite end has a stop 31 that prevents the sliding movement of the arm through opening 27 to restrict movement of the lid beyond a desired limit. Also, in accordance with the preferred embodiment the holder 10 may be contained within a case 28.

Figure 2:
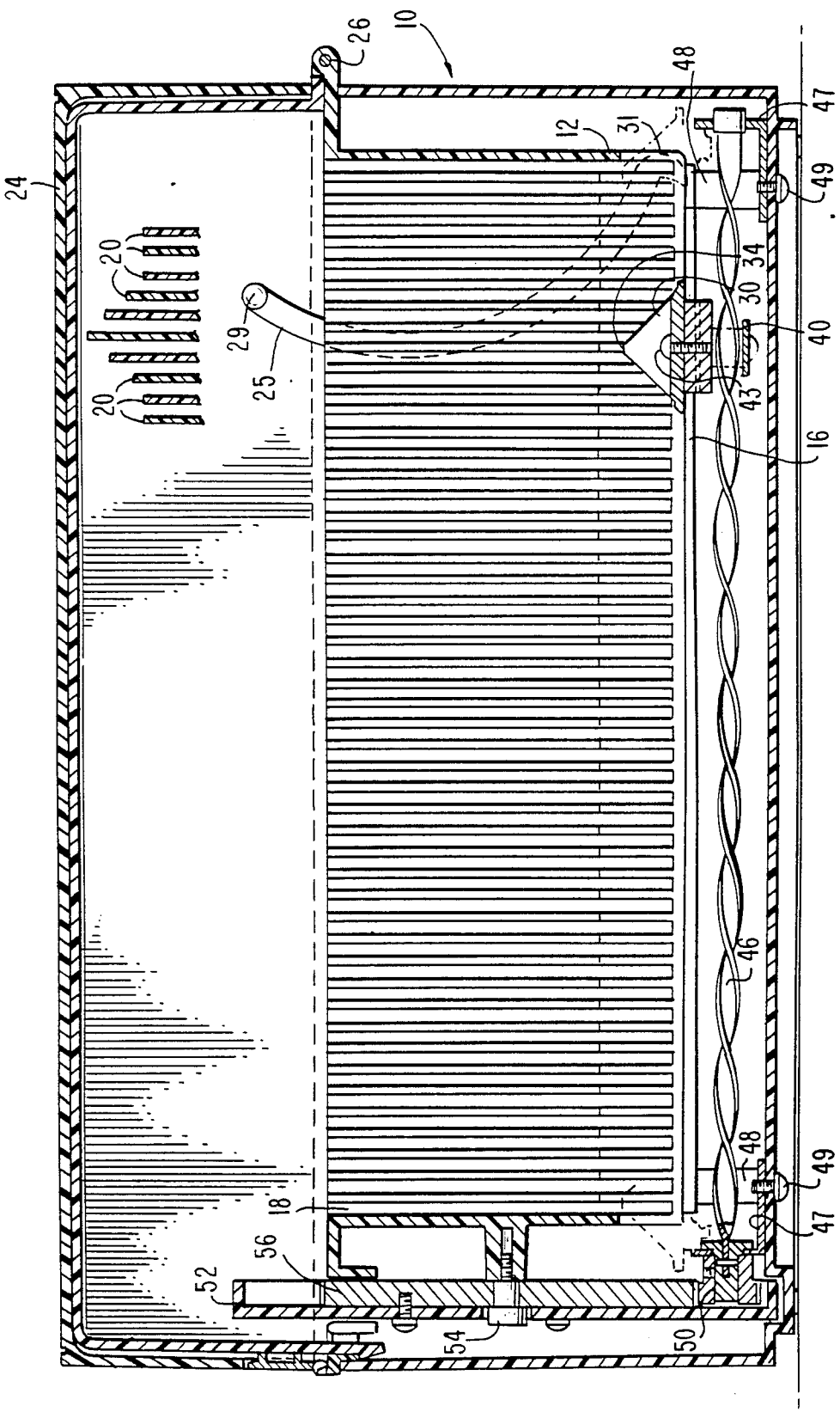
FIG. 2 is an elevation view in vertical cross section of the holder.
Figure 3:
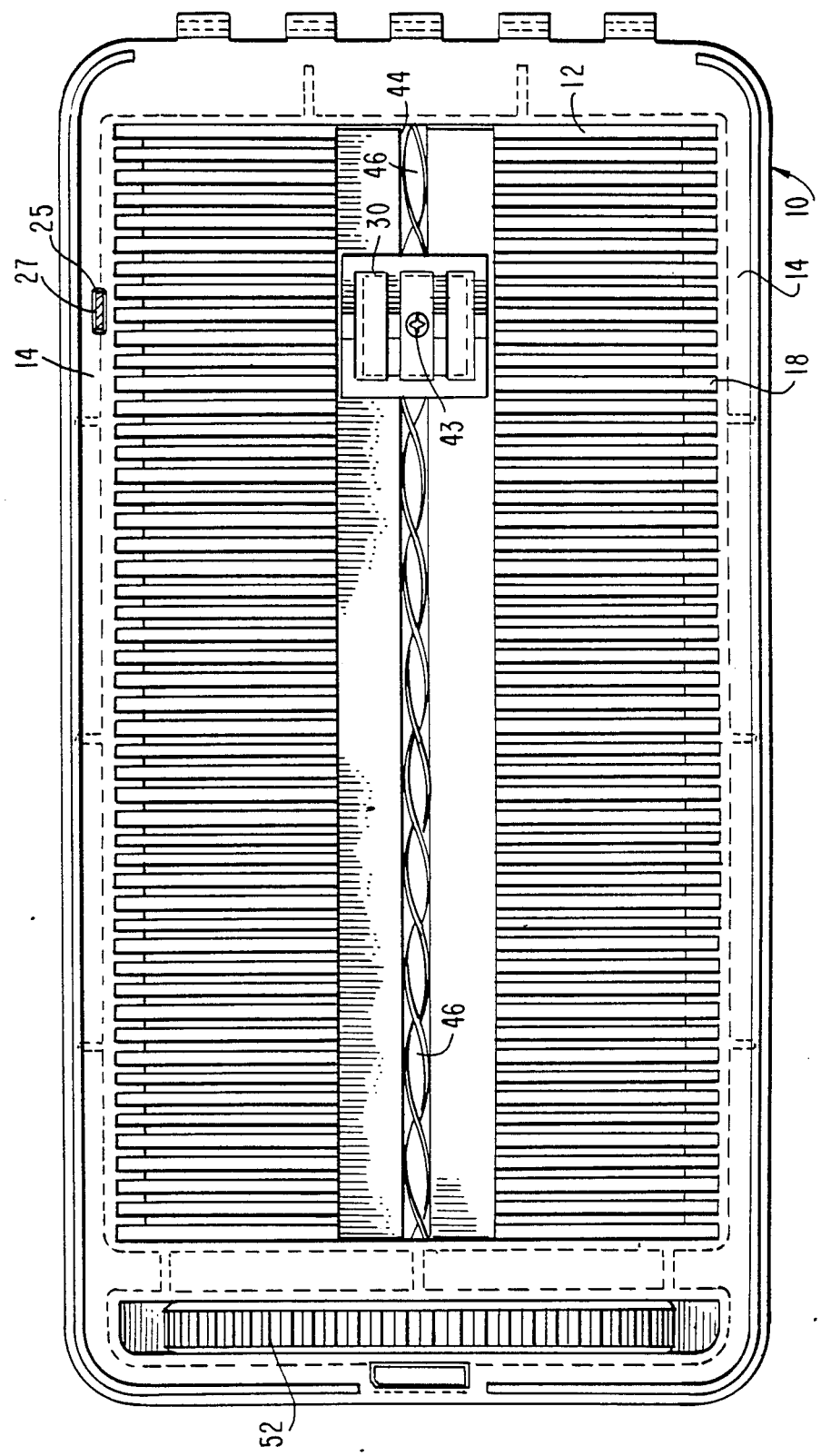
FIG. 3 is a plan view of the holder.
Figure 4:
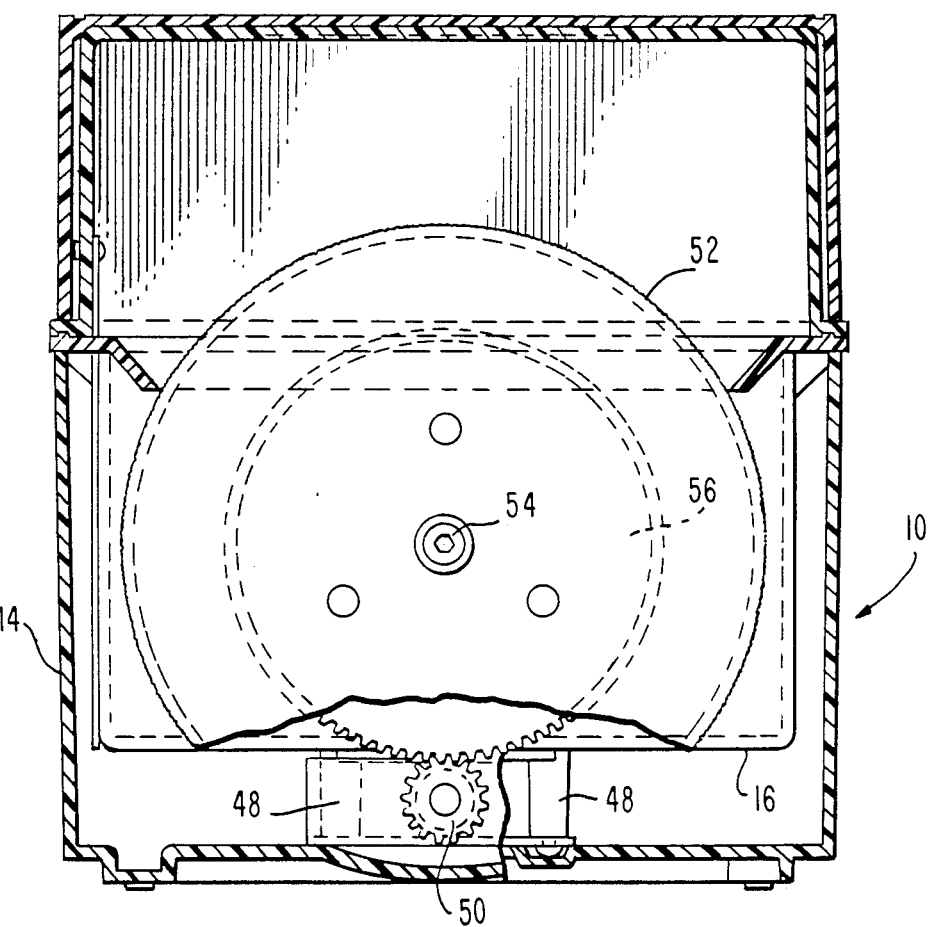
FIG. 4 is an end elevation view of the holder with parts broken away to show details of construction.
Figure 5:
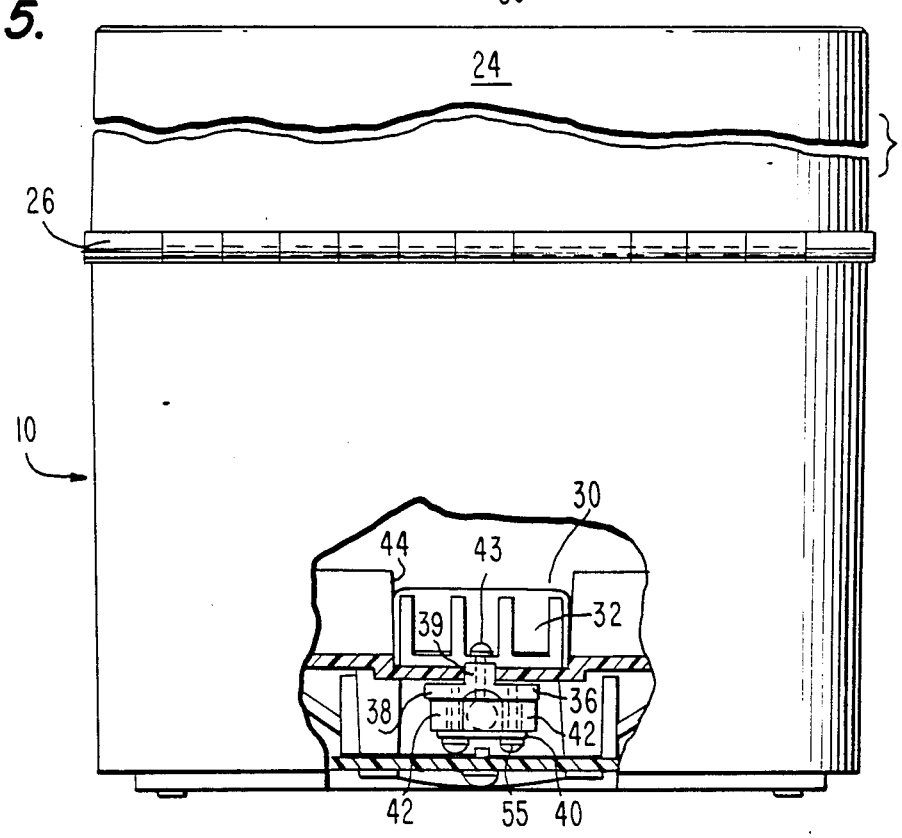
FIG. 5 is an end view of the holder with parts broken away to show details of one embodiment of a cam follower of the indexing means.
Figure 6:
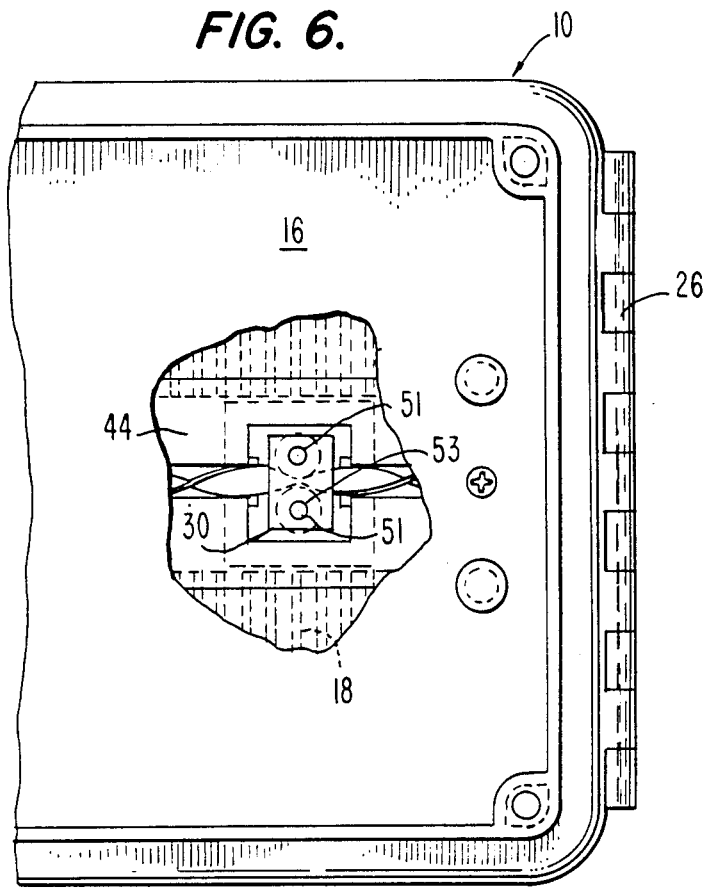
FIG. 6 is a bottom view of the holder with parts broken away to show details of the cam follower in association with the worm gear.
Figure 7:
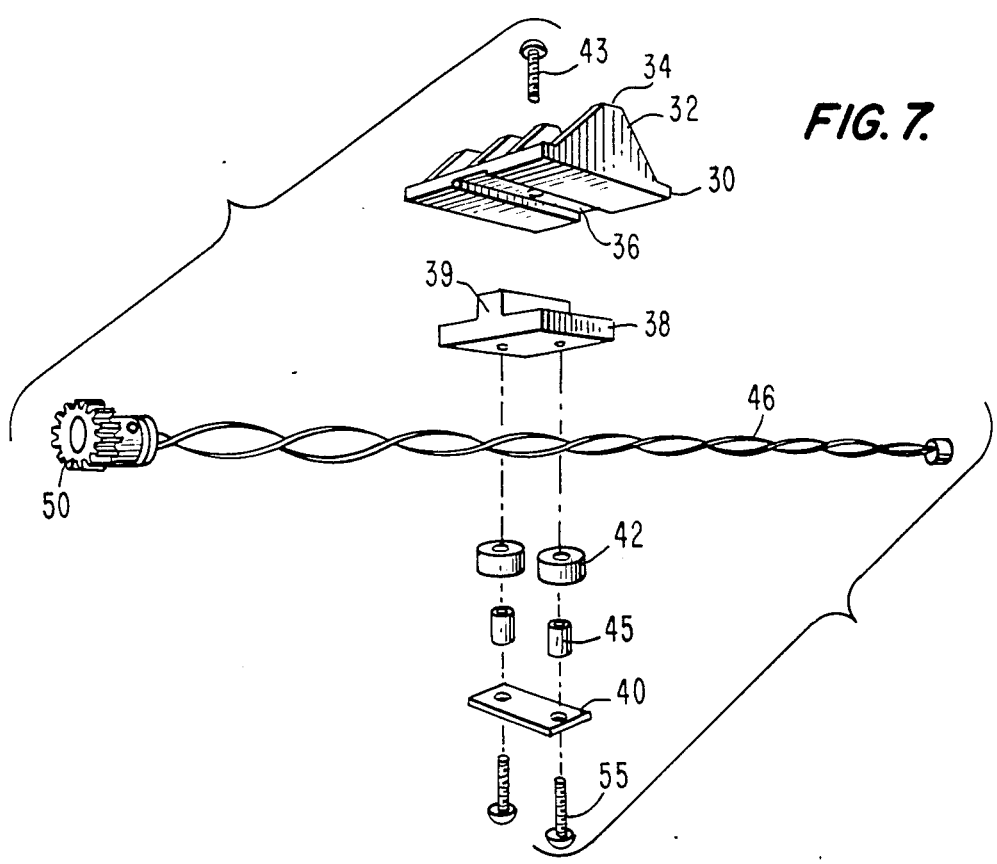
FIG. 7 is an exploded view showing details of the structure and assembly of the cam follower and the associated worm gear.

When the diskettes 20 are stored within the slots 18 of holder 10 in accordance with the invention, they are aligned in side-by-side relation and are slidable in vertical relationship within the slots, as best shown in FIG. 2 with respect to the preferred embodiment of invention. Further in accordance with the invention indexing means are provided which are adapted for movement along the interior portion of holder 10 to sequentially engage an edge portion of each article and to slide each engaged article within the slot to a position out of alignment with the remainder of the stored articles. In accordance with the preferred embodiment, the indexing means includes a cam follower 30. As best shown in FIGS. 5, 6 and 7, the cam follower 30 has a ribbed top cam portion 32 with a cross section tapered toward a flat apex 34 thereof. The top of the cam is flat to permit descrete elevation of a single diskette distinctly above those before and after it in front to back alignment which are on the rise or decline on the cam portion 32. Beneath the cam portiion 32 there is a slot 36 separating the cam portion 32 from a generally rectangular base 38 onto which mounting 40 is attached. The base 38 has an upstanding rib 39 extending into slot 36 of cam follower 30. The top cam portion 32, base 38 and mounting 40 are connected by a rivet 43; however, this assembly may be of one-piece molded construction. Rollers 42 journaled for rotation on bearings 45 are secured between base 38 and mounting 40 by screws 55. Centrally along the base 16 of the holder 10 is a slot 44, as best shown in FIGS. 5 and 6. The indexing means 30, as best shown in FIGS. 1, 2 and 3 is slidably mounted within this slot. As best shown in FIGS. 2, 3, 6 and 7, a worm gear 46 is connected to the cam follower 30 by rollers 42 on the base 40. Rollers 42 facilitate movement of the follower 30 along the worm gear. The worm gear 46 is journaled for rotation within L-shaped retainers 47 connected to studs 48 by rivets 49. This assembly may alternately be of one-piece molded construction. The studs 48 are connected at opposite ends to the exterior of base 16 of the holder 10. A gear wheel 50 is connected to one end of the worm gear 46. A manually operated wheel 52 is journaled at 54 to the holder 10 and is connected to a co-planar gear 56 that is in driving engagement with gear wheel 50 of the worm gear 46.

In operation, when the manually operated wheel 52 is rotated, corresponding rotation of associated, co-planar gear 56 rotates the gear wheel 50 connected to worm gear 46 to cause the cam follower 30 to move along the worm gear within the slot 44 in a direction determined by the direction of rotation of manually operated wheel 52. As the cam portion 32 of the cam follower 30 engages each diskette 20, as best shown in FIG. 2, the diskette so engaged is moved upwardly, as viewed in the drawings. At the flat apex 34 the diskette is raised a distance sufficient that the indicia of identification 22 thereof may be viewed apart from the remainder of the stored diskettes. In this manner, by rotating the manually operated wheel 52 in a selected direction, the cam follower 30 constituting the indexing means may be moved along the holder 10 to sequentially expose the indicia of identification for each diskette until the diskette desired is identified. It may then be readily removed as it is in a position where an edge potion thereof is out-of-alignement with the remainder of the stored diskettes, and it may be grasped at this edge for manual removal.

It will be apparent to those skilled in the art that various modifications and variations can be made in the diskette holder, a preferred embodiment thereof being shown and described herein. As an example, the worm gear could be motor driven instead of being manually operated. Also, the device could be adapted to have the indexing component automatically move back and forth along the diskette holder sequentially engaging and sliding each diskette until stopped by an operator when the desired diskette has been identified. Therefore, it is intended that the present invention cover the modifications and variations of this invention provided they come within the scope of the appended claims and their equivalents.

We claim:

1. A container for storing a plurality of substantially flat articles, such as word-processing diskettes, said container comprisisng an article holder having an elongated, generally rectangular interior with a plurality of slots each for receiving an article to be stored with said articles being aligned in sibe-by-side relation and slidable in opposite directions within said slots, indexing means for movement along said elongated interior to sequentially engage an edge portion of each article and simultaneous with said engaging to sequentially slide each engaged article within said slot to a position out of alignment with the remainder of said stored articles, said indexing means being in continuous article engagement during said movement along said elongated interior.

2. The container of claim 1 wherein each of said articles has indicia of identification on an edge portion thereof opposite said edge engaged by said indexing means and when said indexing means engages an article edge portion and slides said engaged article said indicia of identification is out of alignment with the indicia of identificatiion of the remainder of said articles.

3. The container of claim 1 wherein said indexing means includes a cam that sequentially engages an edge protion of each article and simultaneous with said engaging sequentially slide each said article to said position out of alignment with the remainder of said stored articles.

4. The container of claim 1 wherein said articles are stored in said slots with an edge of each article resting on a base of said holder and said indexing means includes a cam for reciprocal movement along said base to sequentially engage an edge portion of each article and simultaneous with said engaging sequentially slide each said article to said position out of alignment with the remainder of said stored articles.

5. The container of claim 4 wherein cam moving means are provided for imparting reciprocal movement to said cam, said cam moving means including a worm gear, a worm drive gear drivingly connected to said worm gear for imparting rotational movement to said worm gear and said cam comprising a follower connected to said worm gear to move along said worm gear upon rotation thereof.

6. The container of claim 5 wherein said cam moving means further includes means for manually operating said worm drive gear.

7. The container of claim 6 wherein said means for manually operating said worm drive gear is a manually-operated wheel.

8. A container for storing a plurality of substantially flat articles, such as word-processing diskettes, said container comprising an article holder having an elongated generally rectangular interior with a plurality of slots each for receiving an article to be stored with said article being aligned in side-by-side relation and slidable in opposite directions within said slots, each of said articles having an edge resting on a base of said holder and an opposite edge having thereon an indicia of identification, indexing means including a cam follower connected to a worm gear for reciprocal movement along said base, a manually operated worm drive gear drivingly connected to said worm gear for imparting rotational movement to said worm gear, said cam follower during said reciprocal movement traveling along said base to sequentially engage said edge of each article resting on said base and simultaneous with said engaging to sequentially slide each engaged article within said slot to a position that said edge having said indicia of identification is out of alignment with the indicia of identification of the remainder of said articles, said indexing means being in continuous article engagement during said movement along said elongated interior.

9. The container of claim 8 wherein said cam follower engages said article edges at substantially the midpoint thereof.

10. The container of claim 9 wherein said worm gear extends along said base of said holder substantially perpendicular to said article edges resting on said base.

11. The container of claim 10 wherein a manually operated wheel is journaled on said holder and drivingly engages said worm drive gear.

12. The container of claim 11 wherein said cam follower has a flat apex article-engaging surface.

* * * * *